United States Patent [19]
Li et al.

[11] Patent Number: 6,078,979
[45] Date of Patent: Jun. 20, 2000

[54] SELECTIVE ISOLATION OF A STORAGE SUBSYSTEM BUS UTILZING A SUBSYSTEM CONTROLLER

[75] Inventors: Shaojie Li, Austin; Truc M. Nguyen, Round Rock, both of Tex.

[73] Assignee: Dell USA, L.P., Round Rock, Tex.

[21] Appl. No.: 09/100,048

[22] Filed: Jun. 19, 1998

[51] Int. Cl.[7] .................................................. G06F 13/00
[52] U.S. Cl. ........................................... 710/129; 709/203
[58] Field of Search .................................. 709/203, 219; 710/126, 129, 200; 714/4

[56] References Cited

U.S. PATENT DOCUMENTS

| | | |
|---|---|---|
| 5,454,085 | 9/1995 | Gajjar et al. . |
| 5,471,634 | 11/1995 | Giorgio et al. . |
| 5,495,584 | 2/1996 | Holman, Jr. et al. . |
| 5,566,345 | 10/1996 | Ostrowski . |
| 5,572,685 | 11/1996 | Fisher et al. . |
| 5,586,271 | 12/1996 | Parrett . |
| 5,596,727 | 1/1997 | Literati et al. . |
| 5,596,757 | 1/1997 | Smith . |
| 5,613,074 | 3/1997 | Galloway . |
| 5,644,789 | 7/1997 | Matthews et al. . |
| 5,802,327 | 9/1998 | Hawley et al. .......................... 710/101 |
| 5,845,147 | 12/1998 | Vishlitzky et al. ..................... 710/200 |

OTHER PUBLICATIONS

*The Winn L. Rosch Hardware Bible, Third Edition,*© 1994 Sams Publishing, pp. 894–909.

Press Release entitled "American Megatrends Announces New Solutions for Highly Available Clusters", Feb. 12, 1997, http://www.ami.com/pr/1998/PR98–12.html.

Cluster Enabler SE–SE Bus Extender (Series 436), http://www.ami.com/megaraid/436_spec.html,© 1998 American Megatrends, Inc.

Cluster Enabler Isolator/Enabler (Series 435), http://www.a-mi.com/megaraid/436_spec.html,© 1998 American Megatrends, Inc.

MegaRAID Controllers, http://www.ami.com/megaraid/436_spec.html,© 1998 American Megatrends, Inc.

Cluster Enabler, Apr. 14, 1998,© 1998 American Megatrends, Inc.

*Primary Examiner*—Glenn A. Auve
*Attorney, Agent, or Firm*—Skjerven Morrill MacPherson Franklin & Friel, LLP; David G. Dolezal

[57] ABSTRACT

A shared data storage subsystem having a system controller embedded in a backplane of the shared data subsystem. The system controller monitors the TERMPWR signals of SCSI server busses physically coupled to the shared data subsystem to operably couple and isolate a server SCSI bus with the share data subsystem SCSI bus provides. The system can be used to isolate a server from a data storage subsystem without affecting the operation of other servers operably coupled to the data storage subsystem. The servers and shared data subsystem are implemented in a cluster system. The system controller also monitors environmental conditions of the shared data subsystem. The shared data subsystem includes a plurality of data storage devices such as hard disk drives which can be organized in a RAID configuration.

42 Claims, 4 Drawing Sheets

SELECTIVE ISOLATION OF A STORAGE SUBSYSTEM BUS UTILZING A SUBSYSTEM CONTROLLER

BACKGROUND OF THE INVENTION

1. Field of the Invention

This invention relates to computer systems in general and more specifically to selective isolation of a computer system server from a shared data storage subsystem.

2. Description of the Related Art

The capability of a computer system such as a computer server to enable a number of computer systems such as personal computer systems to retrieve data from a remote and common data storage subsystem over a computer system network has lead to a proliferation in the use of computer systems in the business environment.

One type of information handling system for providing access for a number of computer systems to a common data storage subsystem is a cluster system. A cluster system includes at least two servers or nodes operably coupled to a data storage subsystem. The data storage subsystem typically includes a plurality of data storage devices such as hard disk drives. In one type of cluster system, each server has the capability of controlling the storage and retrieval of data on each of the individual hard disk drives. With this type of cluster system, each storage unit is individually addressable by both servers.

The cluster system described above can be implemented using the Small Computer System Interface (SCSI) bus architecture. SCSI is a computer system bus architecture standard specified by the American National Standards Institute (ANSI). The SCSI standard specifies the parameters of a computer system bus including the number, type, and function of the SCSI signals used in a SCSI bus. A SCSI computer bus (SCSI bus) is commonly used to communicate data between a computer system and a peripheral device, such as a hard disk drive.

SUMMARY OF THE INVENTION

It has been discovered that utilizing a data storage subsystem controller to operably couple and isolate a server bus with a data storage subsystem bus provides an efficient system for isolating a server from a data storage subsystem. Furthermore, with such a system, a failure of one of the servers or server busses will not affect the operation of the other servers coupled to the data storage subsystem.

In one aspect of the invention, an information handling system includes a first computer system and a first SCSI bus. The first computer system is operably coupled to the first SCSI bus. The information handing system also includes a data storage subsystem that includes a second SCSI bus capable of being operably coupled to a data storage device. The data storage subsystem also includes a first SCSI connector circuit that, when activated, operably couples the first SCSI bus with the second SCSI bus. The data storage subsystem also includes a subsystem controller. The subsystem controller deactivates the first SCSI connector circuit to operably isolate the first SCSI bus from the second SCSI bus based upon a first SCSI signal from the first SCSI bus.

In another aspect of the invention, an information handling system includes a first server, a second server, a first SCSI bus, a second SCSI bus, and a data storage subsystem. The first server is operably coupled to the first SCSI bus via a first SCSI controller. The second server is operably coupled to the second SCSI bus via a second SCSI controller. The data storage subsystem includes a third SCSI bus having two ends. The third SCSI bus is terminated at both ends. A data storage device is operably coupled to the third SCSI bus. The data storage subsystem further includes a first SCSI connector circuit that, when activated, operably couples the first SCSI bus with the third SCSI bus. The data storage subsystem also includes a second SCSI connector circuit, that, when activated, operably couples the second SCSI bus with the third SCSI bus. The data subsystem also includes a subsystem controller. The subsystem controller deactivates the first SCSI connector circuit to operably isolate the first SCSI bus from the third SCSI bus in response to a first SCSI signal from the first SCSI bus transitioning to an inactive state. The subsystem controller deactivates the second SCSI connector circuit to operably isolate the second SCSI bus from the third SCSI bus in response to a second SCSI signal from the second SCSI bus transitioning to an inactive state.

In another aspect of the invention, an information handling system includes a first server, a second server, a third server, a first SCSI bus, a second SCSI bus, a third SCSI bus, and a data storage subsystem. The first server is operably coupled to the first SCSI bus. The second server is operably coupled to the second SCSI bus. The third server is operably coupled to the third SCSI bus. The data storage subsystem includes a fourth SCSI bus and a data storage device operably coupled to the fourth SCSI bus. The first, second, and third SCSI busses are operably coupled to the fourth SCSI bus. The data storage device is accessible by the first, second, and third servers.

In another aspect of the invention, a data storage subsystem includes a first SCSI bus and a connector operably coupled to the first SCSI bus for operably coupling a data storage device to the first SCSI bus. The data storage subsystem also includes a first SCSI connector that, when activated, operably couples a second SCSI bus with the first SCSI bus. The data storage subsystem also includes a second SCSI connector circuit that, when activated, operably couples a third SCSI bus with the first SCSI bus. The data storage subsystem further includes a subsystem controller. The subsystem controller deactivates the first SCSI connector circuit to operably isolate the second SCSI bus from the first SCSI bus in response to a first SCSI signal from the second SCSI bus transitioning to an inactive state. The subsystem controller deactivates the second SCSI connector circuit to operably isolate the third SCSI bus from the first SCSI bus in response to a second SCSI signal from the third SCSI bus transitioning to an inactive state.

In another aspect of the invention, a data storage subsystem includes a first terminated bus and a connector operably coupled to the first terminated bus for operably coupling a data storage device to the first terminated bus. The data storage subsystem also includes a first connector circuit that, when activated, operably couples a second terminated bus with the first terminated bus. The data storage subsystem also includes a second connector circuit that, when activated, operably couples a third terminated bus with the first terminated bus. The data storage subsystem further includes a subsystem controller. The subsystem controller deactivates the first connector circuit to operably isolate the second terminated bus from the first terminated bus in response to a termination power signal from the second terminated bus transitioning to an inactive state. The subsystem controller deactivates the second connector circuit to operably isolate the third terminated bus from the first terminated bus in response to a termination power signal from the third terminated bus transitioning to an inactive state.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
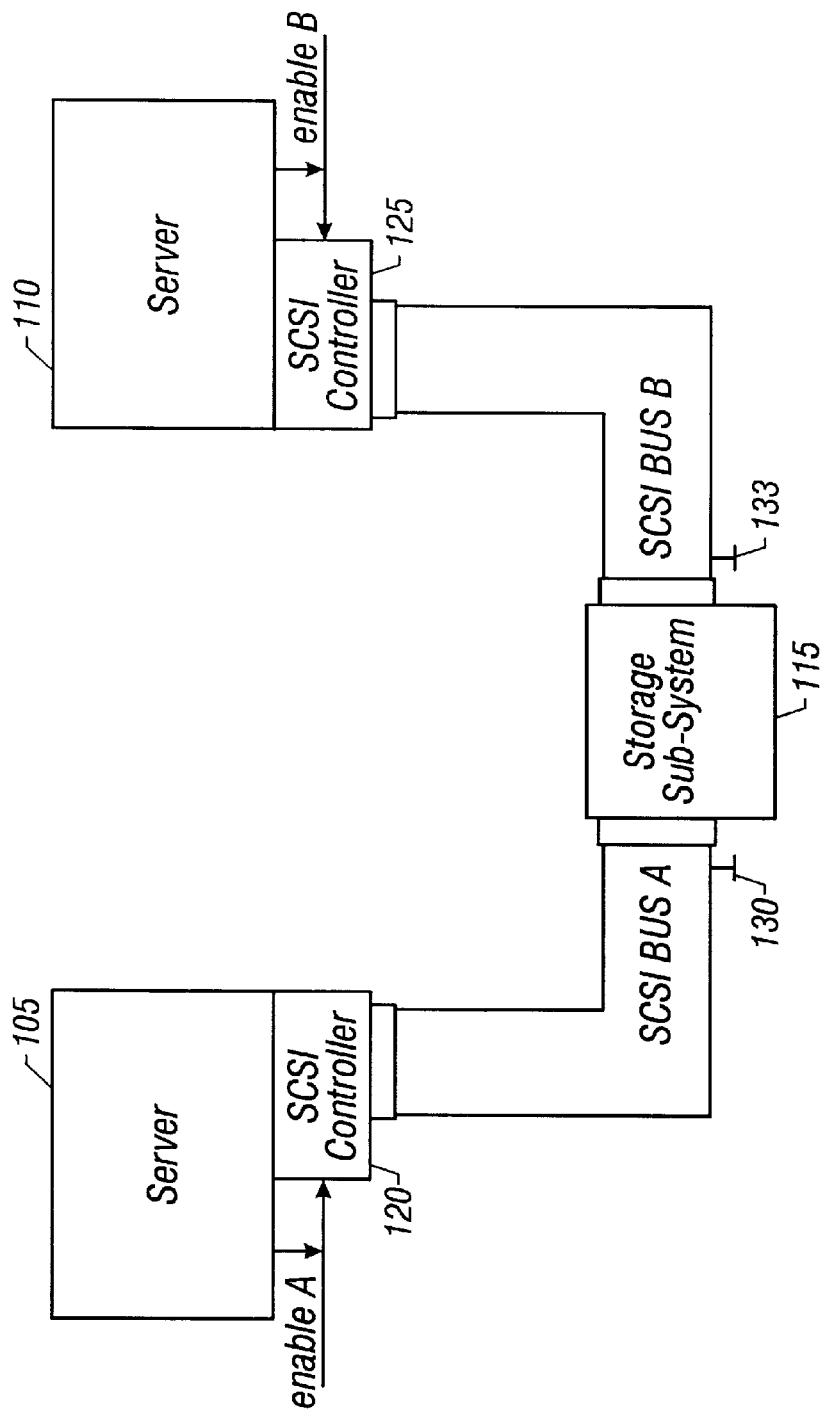
FIG. 1 is a block diagram of one embodiment of an information handling system according to the present invention.

FIG. 1 shows an information handling system according to the present invention. The information handling system shown in FIG. 1 is a cluster system. In the embodiment shown, the cluster system includes two computer systems 105 and 110, each capable of storing and retrieving data on a common data storage subsystem 115. The cluster system is controlled by an operating system program, which in one embodiment, is a program offered under the trade designation of MICROSOFT CLUSTER SERVER (SCS)™ for an operating system offered under the trade designation of WINDOWS NT SERVER, ENTERPRISE EDITION 4.0™, both by the MICROSOFT Corporation.

In the embodiment shown, computer systems 105 and 110 are computer servers that enable a plurality of computers systems such as personal computer systems (not shown) operably coupled to the computer servers to store and retrieve data on the data storage subsystem 115. These personal computer systems (not shown) are operably coupled to servers 105 and 110 via computer networks such as a local area network (LAN) (not shown). The data accesses by the personal computer systems to the data storage subsystem 115 are controlled by servers 105 and 110. In one embodiment, the computer servers 105 and 110 are connected in a redundant configuration such that if one server becomes inoperable, the other server can provide access to the data storage subsystem 115 for the personal computer systems coupled to the LAN. In one embodiment, the servers are sold under the trade designation of POWER EDGE 6100™ by DELL USA L.P. In some embodiments, servers 105 and 110 may each include a local SCSI data storage subsystem that includes hard disk drives operably coupled to a local SCSI bus.

Computer servers 105 and 110 access the data storage subsystem 115 via SCSI busses A and B, respectively. In the embodiment shown, SCSI busses A and B conform to the SCSI standard architecture. In other embodiments, the SCSI busses A and B conform to other SCSI standards such as the SCSI-2 or the SCSI-3 standard architectures or any other standards based upon the SCSI standards. It is understood that the term "SCSI bus" refers to a bus that conforms to a SCSI standard or any bus standard based upon a SCSI standard. In the embodiment shown, SCSI busses A and B are single ended SCSI buses. In other embodiments, SCSI busses A and B are differential SCSI busses. In the embodiment shown, SCSI busses A and B are wide SCSI busses. In other embodiments, the SCSI busses A and B may be narrow SCSI busses.

In the embodiment shown, the SCSI busses A and B are physically implemented on flexible SCSI cables with multiple conductors that carry the SCSI signals as per the SCSI standard to which the SCSI bus conforms.

The SCSI standards specify the parameters for implementing and operating a computer system bus. The standards specify the cable type and length, the operating speeds, the addressing schemes, and the signaling protocol utilized on the bus. The SCSI standards also specify type, number, and function of the signals utilized by a SCSI bus including control signals and data signals. One type of standard SCSI signal or SCSI signal specified by the SCSI standards is the termination power signal or the TERMPWR signal. Other specified SCSI signals for one SCSI standard include SCSI data signals DB0–7 (data bits 0–7) and DBP (Parity) and SCSI control signals ATN (attention), BSY (busy), ACK (acknowledge), RST (reset), MSG (message), SEL (select), C-D (command data), REQ (request), I-O (input-output data direction) and various GND (ground) signals.

Computer servers 105 and 110 are operably coupled to the SCSI busses via SCSI controllers 120 and 125, respectively. SCSI controllers 120 and 125 provide and receive the SCSI signals that enable the servers to communicate with the SCSI devices (see FIG. 2) in the data storage subsystem 115. In one embodiment, servers 105 and 110 provide and receive data to and from the SCSI controllers via computer system busses conforming to other computer system bus architectures such as the PCI standard architecture.

In the embodiment shown, SCSI controllers 120 and 125 can be activated and deactivated by an enable signal (the enable A signal and the enable B signal, respectively). These enable signals are provided from an external source such as a hard-wired switch or from the server providing the enable signal as part of a start up or shut down routine or in response to a user command to isolate the server from the storage subsystem 115.

The SCSI standards specify at least one signal on a SCSI bus (TERMPWR) for providing power to the SCSI terminators coupled the SCSI bus which are typically required to preserve signal integrity on the SCSI bus. One type of SCSI terminator is a passive SCSI terminator. A second type of SCSI terminator is an active SCSI terminator. Differential signals on a differential SCSI bus use another type of SCSI terminator. For further explanation of the termination methods of a SCSI bus, see the "Hardware Bible" by Winn L. Rosch, third edition, pages 894–907.

SCSI controllers 120 and 125 each include internal SCSI terminators for terminating the controller ends of the SCSI bus A and SCSI bus B, respectively. SCSI busses A and B are terminated at the storage subsystem end by SCSI terminators 130 and 133, respectively. In other embodiments, the terminators for the storage subsystem end may be included in the subsystem connector circuits (items 240 and 245 of FIG. 2).

In the embodiment shown, each SCSI controller 120 and 125 provides the termination power signal CERMPWR) or signals that provide power for the SCSI terminators (130 and 133, and the terminators located at the controllers) for each respective SCSI bus. In one embodiment, termination power in each SCSI controller is provided by an output of a Schottky diode connected to a DC voltage source (such as a +5 VDC source). See FIG. 4. However, the termination power signal may be provided by other techniques known in the art.

Figure 4:
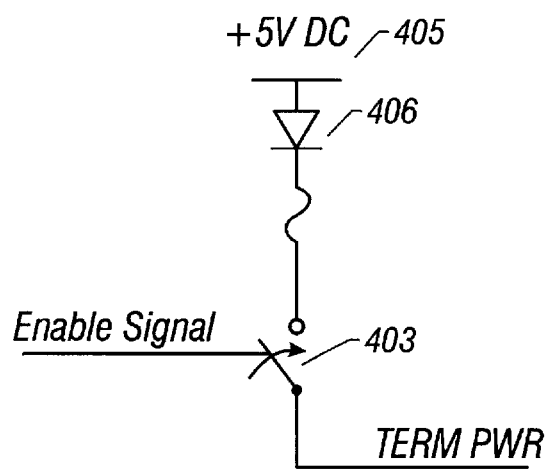
FIG. 4 is a schematic diagram of one embodiment of a circuit for providing a SCSI signal.

In the embodiment shown, when SCSI controller 120 or SCSI controller 125 is deactivated by the enable A signal or the enable B signal, respectively, the corresponding termination power signal provided by the deactivated SCSI controller (120 or 125) on the corresponding SCSI server bus (SCSI bus A or B), transitions from an active state where the voltage level of the termination power signal is at its regular standard voltage level, to an inactive state wherein the conductor or conductors carrying the termination power signal are decoupled from a power source providing the termination power. Conversely, in the embodiment shown, activating a SCSI controllers (120 or 125) with the corresponding enable signals (A or B) causes the corresponding termination power signal to transition to an active state where the voltage level rises to the standard voltage level due to the conductor or conductors carrying the termination power signal being coupled to the controller power source. In one embodiment, the enable signal activates and deactivates the SCSI controller's DC power source that provides the termination power signal. In the embodiment of FIG. 4, the enable signal activates an electrically controllable switch 403 which is connected in series with a SCSI controller's DC power source 405 and a Schottky diode 406 to provide a termination power signal responsive to the enable signal. In one embodiment, the electrically controllable switch is a Field Effect Transistor (FEI) whose gate is responsive to the enable signal.

Figure 2:
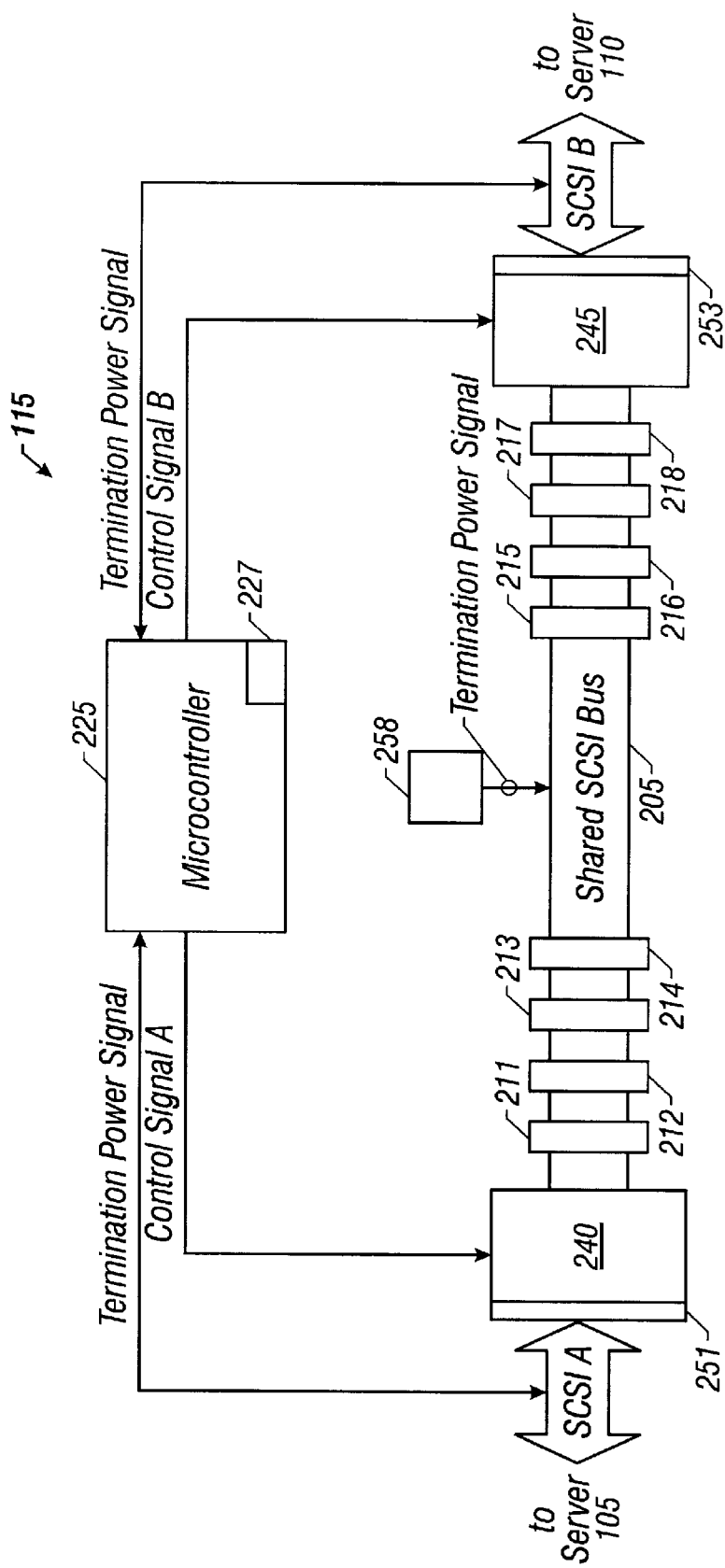
FIG. 2 is a diagram of one embodiment of a data storage subsystem according to the present invention.

FIG. 2 shows a schematic diagram of one embodiment of a data storage subsystem according to the present invention. In the embodiment shown, the data storage subsystem 115 includes eight peripheral data storage SCSI devices 211–218 operably coupled to a SCSI bus 205. Subsystem 115 is scaleable in that it can support from one to fourteen peripheral storage devices. In the embodiment shown, the storage devices 211–218 are hard disk drives. In other embodiments, other types of SCSI compatible data storage devices may be used such as tape drives or CD ROMs. In one embodiment, the data storage subsystem is housed in a chassis housing that includes carrier bays in which the peripheral data storage devices are inserted to be operably coupled to the SCSI bus 205. In the embodiment shown, the SCSI bus 205 is implemented on a SCSI backplane. The SCSI backplane includes eight SCSI physical connectors for coupling the data storage devices 211–218 to the SCSI bus 205. In one embodiment, the data subsystem may include electrically controllable peripheral connector circuits that are used to operably couple and isolate peripheral data storage devices to the shared SCSI bus 205. In some embodiments, the peripheral connector circuits allow the data storage devices to be "hot-pluggable".

In the embodiment shown, SCSI bus 205 is a single ended, wide bus conforming to the SCSI-2 standard architecture. In other embodiments, SCSI bus 205 may conform to other types of SCSI standards, architectures, or protocols.

Data storage subsystem 115 includes a subsystem management controller 225. In one embodiment, subsystem management controller 225 monitors various parameters of the data storage subsystem and provides information to the servers regarding those parameters. For example, subsystem management controller 225 monitors the subsystem operating temperature, controls the subsystem fan(s), and monitors the operability of storage devices 211–218. In the event of a drive failure, subsystem management controller 225 provides an indication to the servers 105 and 110 that the hard disk drive has failed. Subsystem management controller 225 includes firmware 227 in which the subsystem management controller executes in performing its management functions. In one embodiment, the subsystem management controller 225 is embedded in the SCSI backplane. In one embodiment, the subsystem management controller is offered under the trade designation of 80552 by PHILLIPS.

In the embodiment shown, hard disk drives 211–218 are individually accessible by servers 105 and 110 via SCSI bus A and SCSI bus B, respectively. In one embodiment, data is stored on the hard disk drives 211–218 in a Redundant Array of Inexpensive Disks (RAID) configuration. SCSI Bus A and SCSI bus B are coupled to the shared SCSI bus 205 via connector circuits 240 and 245, respectively. In one embodiment, connector circuits 240 and 245 are SCSI repeaters which are a type of SCSI driver circuits. A SCSI driver circuit is a device used to extend the physical length of a SCSI bus beyond that imposed by the SCSI standards. Driver circuits perform the basic actions of restoring signal amplitude, waveform, and timing applied to the SCSI data and control signals. In one embodiment, the SCSI driver circuits 240 and 245 are expander chips offered under the trade designation 53C120 by SYMBIOS and are physically attached to the SCSI backplane. In other embodiments, other types of connector circuits or other types of driver circuits may be used to couple a server SCSI bus to a shared subsystem SCSI bus.

In the embodiment shown, the connector circuits 240 and 245 each include an external, physical SCSI connector (items 251 and 253, respectively) that is used to attach the SCSI cable of the SCSI server bus to the SCSI connector circuit. In one embodiment, subsystem management controller 225 detects the attachment of the SCSI cables to the physical SCSI connectors of the connector circuits.

Connector circuits 240 and 245 have an activation feature that allows a control circuit such as the subsystem management controller to selectively couple and selectively isolate the server SCSI busses A and B with the shared SCSI bus 205. In the embodiment shown, when SCSI connector circuit 240 is activated, SCSI bus A is operably coupled to the shared SCSI bus 205 such that Server 105 can individually access the peripheral storage devices 211–218 to store and retrieve data on the storage devices. In the embodiment shown, when driver circuit 240 is activated, line drivers in the SCSI driver circuit are activated or enabled to provide for the transparent, bi-directional propagation of the SCSI signals between the two SCSI busses. When the SCSI driver circuit 240 is deactivated, the line drivers are disabled so as to prevent the SCSI signals generated on the shared SCSI bus from propagating to the server SCSI bus A. SCSI driver circuit 245 operates in a similar manner. In other embodiments, connector circuits 240 and 245 include electrically activated switches that electrically couple the connectors of each server SCSI bus cable to the connectors of the shared SCSI bus 205. In other embodiments, the connector circuits may utilize tri-state buffers or Field Effect Transistors (FETs).

In the embodiment shown, except for the termination power signals, all standard SCSI signals from the server SCSI bus A can be propagated to the shared SCSI bus 205, and vice versa, when driver circuit 240 is activated. The termination power signal(s) of each SCSI bus are isolated regardless of whether the connector circuit is activated. The terminators that terminate the ends of the shared SCSI bus 205 are coupled to a 5 volt DC power supply that provides power to the data subsystem 115.

Subsystem management controller 225 activates and deactivates the SCSI driver circuits 240 and 245 based upon SCSI signals from the respective server SCSI busses. Subsystem management controller 225 includes inputs for monitoring a termination power signal from each server SCSI bus. Subsystem management controller 225 also includes an output for providing a control signal A to driver circuit 240 and an output for providing a control signal B to driver circuit 245. Control signals A and B control the activation and deactivation of the SCSI driver circuits 240 and 245, respectively. In the embodiment shown, control signals A and B are discrete signals having an active state or voltage level and an inactive state or voltage level.

To operably couple the server SCSI bus A to the shared SCSI bus 205, subsystem management controller 225 monitors a termination power signal from the SCSI bus A to detect a change in state of the termination power signal from an inactive state to an active state. The termination power signal is provided by the SCSI controller 120. When SCSI controller 120 provides a specific voltage on the termination power signal line of SCSI bus A, subsystem management controller 225, executing firmware 227, senses that the voltage level of the termination power signal has transition above a particular voltage level and activates driver circuit 240 by changing the state of the control signal A to an active voltage level. Activating driver circuit 240 operably couples SCSI bus A to the shared SCSI bus 205.

In other embodiments, the activation of the SCSI driver circuit 240 by the subsystem management controller 225 is dependent upon other signals or conditions. For example, in other embodiments, subsystem management controller 225, in addition to monitoring the TERMPWR signal from SCSI bus A, also monitors the voltage level of the power supply for the data subsystem 115 to determine if the data subsystem 115 is operating properly before activating driver circuit 240.

When SCSI bus A is operably coupled to the shared SCSI bus 205, the subsystem management controller monitors the power signal from SCSI bus A to detect a change in state of the termination power signal from an active state to an inactive state. If subsystem management controller 205 senses that a conductor carrying the termination power signal has become decoupled for a power source, subsystem management controller 225, executing firmware 227, deactivates the SCSI driver circuit 240 by driving control signal A to an inactive voltage level or state. Deactivating SCSI driver circuit 240 operably isolates SCSI bus A from the shared SCSI bus 205.

Subsystem management controller 225 monitors a termination power signal from the SCSI bus B and activates and deactivates driver circuit 245 via the control signal B in a similar manner.

Referring back to FIG. 1, to operably isolate server 105 from the storage subsystem 115, the enable A signal is driven to an inactive state which deactivates the SCSI controller 120 and consequently decouples the conductors carrying the termination power signal provided by controller 120 on SCSI bus A from a power source. Subsystem management controller 22S, sensing that the conductor(s) carrying termination power signal have been electrically decoupled from a power source, deactivates driver circuit 240 to operably isolate SCSI bus A, and thus server A, from the storage subsystem 115. To operably couple server 105 to the storage subsystem bus 205, the enable A signal is driven to an active state to activate the SCSI controller 120 which drives the termination power signal on SCSI bus A to a specified or operating voltage level. Sensing that a conductor carrying the termination power signal have been electrically coupled to a power source and that the voltage level of the termination power signal has reached a specified voltage level, the subsystem management controller 225 activates driver circuit 240 to operably couple SCSI bus A and consequently server 105 to the storage subsystem bus 205. Server 110 is selectively coupled and isolated from the storage sub system 115 in a similar manner.

One advantage of using a SCSI driver circuit to selectively isolate the server SCSI busses is that one of the server SCSI busses (A or B) can be operably isolated from the shared SCSI bus 205 without generating transient signals upon the shared SCSI bus 205. Therefore, operably isolating one server SCSI bus from the shared SCSI bus with a SCSI driver circuit does not affect the operation of the other server SCSI bus with the shared SCSI bus. Consequently, a server can be taken off-line without affecting the accessing of data on the storage subsystem by the other server. Another advantage is that a failure of one of the servers or SCSI controllers does not affect the operation of the other server in accessing the shared SCSI bus.

Figure 3:
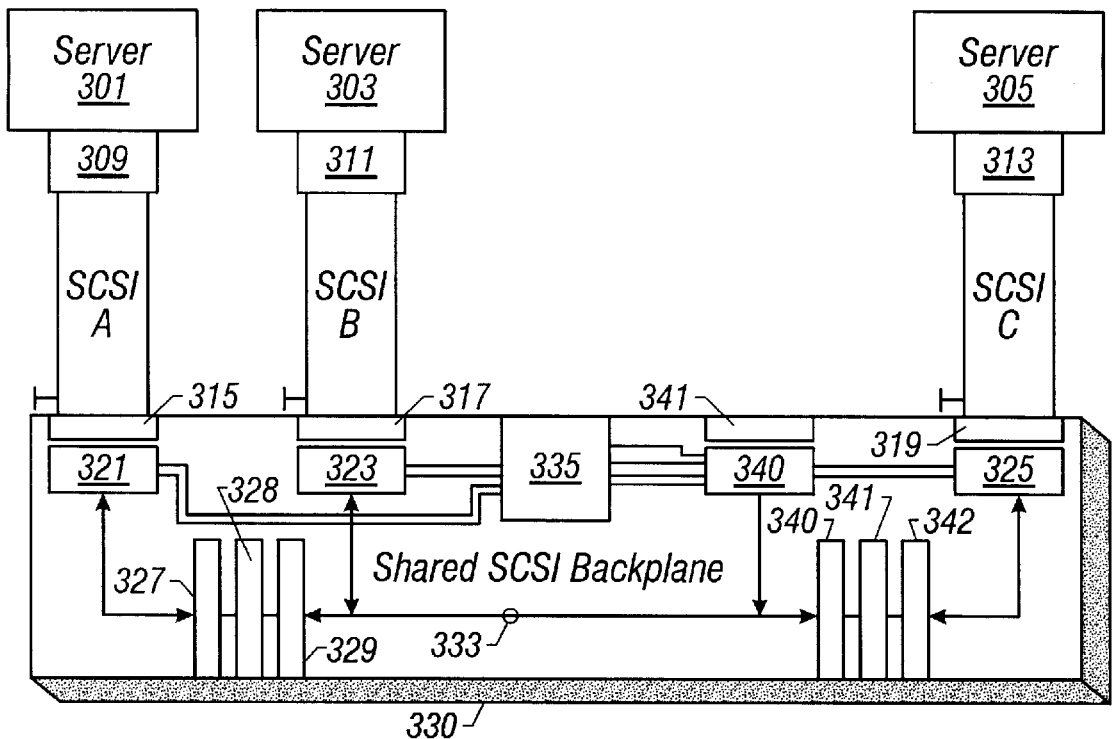
FIG. 3 is a diagram of one embodiment of an information handling system according to the present invention.

FIG. 3 shows one embodiment of an information handling system according to the present invention. The computer system shown in FIG. 3 is a cluster computer system that is scaleable in that up to four servers may be individually and operably coupled to the data storage subsystem 330. FIG. 3 shows three servers 301, 303, and 305 operably coupled to a shared data storage subsystem 330. The shared data storage subsystem 330 includes a shared SCSI bus 333 implemented on a SCSI backplane. Servers 301, 303 and 305 are operably coupled to SCSI busses A, B, and C, respectively, via SCSI controllers 309, 311, and 313, respectively. Embedded in the SCSI backplane are SCSI driver circuit circuits 321, 323, and 325 which operably couple SCSI bus A, SCSI bus B, and SCSI bus C, respectively, to the shared SCSI bus 333. The SCSI cables for the SCSI busses A, B, and C are physically connected to SCSI physical connectors 321, 323, and 325, respectively. The data storage subsystem 330 also includes a fourth embedded SCSI driver circuit 340 and a corresponding SCSI physical connector 341 for operably coupling a fourth server to the shared SCSI bus 333 when a fourth SCSI cable is connected to physical SCSI connector 341. The SCSI physical connectors 315, 317, 319, and 341 are electrically connected to one side of SCSI driver circuits 321, 323, 325, and 340 respectively. Each server SCSI bus (A, B, and C) is terminated at both ends with the SCSI terminators for the server ends located internally in the SCSI controllers 309, 311, and 313.

Operably coupled to the shared SCSI bus are six hard disk drives 337–342. When the SCSI driver circuits 321, 323, and 325 are activated, the hard disk drives 337–342 are each individually accessible by the servers 301, 303, and 305. In one embodiment, the hard disk drives 337–342 store data in a RAID configuration.

The data storage subsystem 330 includes a subsystem management controller 335 embedded in the backplane for monitoring and controlling the operating parameters of the data storage subsystem 330. Subsystem management controller 335 executes firmware (not shown). Subsystem management controller 335 monitors the TERMPWR signal from each SCSI server bus (A, B, and C) and provides a control signal to each SCSI driver circuit 321, 323, 340, and 325 to activate and deactivate the driver circuit to operably couple and operably isolate each server bus to the shared SCSI bus 333. In the embodiment shown, the TERMPWR signal from each SCSI bus is generated by the respective SCSI controller (309, 311, and 313) and provided to the subsystem management controller 335 via the server side of the SCSI driver circuits 321, 323, 340 and 325.

In FIG. 3, the shared SCSI bus 333 conforms to the Ultra SCSI standard and is a wide SCSI bus. Consequently, the SCSI backplane may include physical SCSI connectors for connecting up to 12 peripheral SCSI devices. The shared SCSI bus 333 is terminated at both ends by an internal SCSI terminator located in SCSI driver circuit 321 and an internal SCSI terminator located in SCSI driver circuit 325.

A failure of one of the servers or one of the SCSI controllers coupled to the servers does not affect the operation of the remaining servers in accessing the shared SCSI bus 333.

If all four driver circuits 321, 323, 340, and 325 are deactivated, then subsystem management controller 335, executing firmware (not shown), powers down the data storage subsystem until one of the SCSI driver circuits (321, 323, 340, and 325) is activated.

Figure 5:
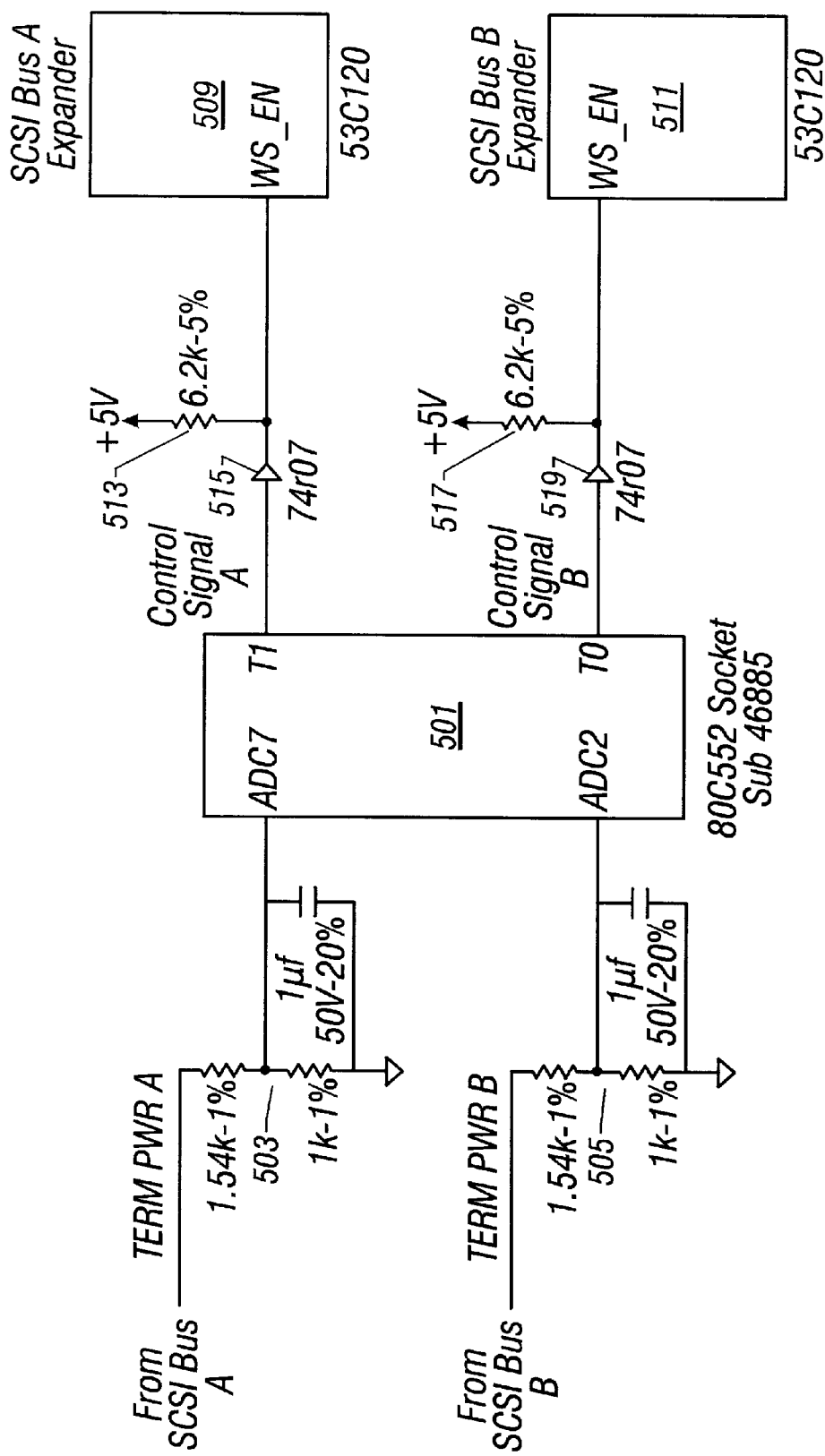
FIG. 5 is a schematic diagram of one embodiment of a circuit enabling a system controller to operably couple and isolate server busses from a data subsystem bus.

FIG. 5 is a schematic diagram of one embodiment of a circuit enabling a system controller to operably couple and isolate server SCSI busses with a data subsystem SCSI bus. System controller 501 is a 80522 controller offered by PHILLIPS. System controller 501 receives a TERMPVR signal from SCSI bus A (not shown in FIG. 5) via voltage divider 503 and receives a TERMPWR signal from SCSI bus B (not shown in FIG. 5) via voltage divider 505. System controller 501 provides control signal A to SCSI expander circuit 509 via an open collector buffer 515 and pull-up resister 513 to operably couple and isolate the shared SCSI bus (not shown in FIG. 5) with SCSI bus A. System controller 501 provides control signal B to SCSI expander circuit 511 via an open collector buffer 519 and pull-up resister 517 to operably couple and isolate the shared SCSI bus (not shown in FIG. 5) to SCSI bus B. Not shown in FIG. 5 are the terminals of driver circuits 509 and 511 for receiving the SCSI signals from the shared SCSI bus and from the server SCSI busses (SCSI bus A and SCSI bus B, respectively). The shared SCSI bus and the server SCSI busses A and B are single ended busses. The differential interface sides of expander chips 509 and 511 are not used and therefore not connected.

In other embodiments, the present invention may be with other types of terminated computer system busses that utilize a bus signal to supply the termination power to the bus terminator.

It is understood that based upon the descriptions herein, that the present invention may be implemented with other bus standards utilizing terminated busses.

While particular embodiments of the present invention have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. An information handling system comprising:
   a first computer system;
   a first SCSI bus, the first computer system operably coupled to the first SCSI bus;
   a data storage subsystem including:
   a second SCSI bus capable of being operably coupled to a data storage device;
   a first SCSI connector circuit, the first SCSI connector circuit, when activated, operably coupling the first SCSI bus with the second SCSI bus;
   a subsystem controller, the subsystem controller, deactivating the first SCSI connector circuit to operably isolate the first SCSI bus from the second SCSI bus based upon a first SCSI signal from the first SCSI bus.

2. The information handling system of claim 1 wherein the subsystem controller deactivates the first SCSI connector circuit in response to a change in state of the first SCSI signal.

3. The information handling system of claim 1 wherein the first SCSI signal is a termination power signal from the first SCSI bus.

4. The information handling system of claim 1 wherein a subsystem controller includes an input for monitoring the first SCSI signal, the subsystem controller includes an output for providing a first control signal to the first connector circuit to deactivate the first SCSI connector circuit.

5. The information handling system of claim 1 wherein the subsystem controller monitors at least one environmental condition of the data storage subsystem.

6. The information handling system of claim 1 wherein the subsystem controller executes firmware to provide the first control signal based upon the first SCSI signal.

7. The information handling system of claim 1 wherein the second SCSI bus is implemented on a SCSI backplane.

8. The information handling system of claim 7 wherein the subsystem controller is embedded in the SCSI backplane.

9. The information handling system of claim 7 wherein the first SCSI connector circuit is embedded in the SCSI backplane.

10. The information handling system of claim 1 wherein:
    the first SCSI signal is a termination power signal from the first SCSI bus;
    the subsystem controller deactivating the first SCSI connector circuit in response to the termination power signal transitioning to an inactive state.

11. The information handling system of claim 1 further comprising:
    a second computer system;
    a third SCSI bus, the second computer system operably coupled to the third SCSI bus;
    wherein data storage subsystem further includes:
    a second SCSI connector circuit, the second SCSI connector circuit when activated, operably coupling the third SCSI bus with the second SCSI bus;
    wherein the subsystem controller deactivates the second SCSI connector circuit to operably isolate the third SCSI bus from the second SCSI bus based upon a second SCSI signal from the third SCSI bus.

12. The information handling system of claim 11 wherein the second SCSI signal is a termination power signal from the third SCSI bus.

13. The information handling system of claim 11 further comprising:
    a third computer system;
    a fourth SCSI bus, the third computer system operably coupled to the fourth SCSI bus;
    wherein the data storage subsystem further including:
    a third SCSI connector circuit, the third SCSI connector circuit, when activated, operably coupling the fourth SCSI bus with the second SCSI bus;

wherein the subsystem controller deactivates the third SCSI connector circuit to operably isolate the fourth SCSI bus from the second SCSI bus based upon a third SCSI signal from the fourth SCSI bus.

14. The information handling system of claim 1 further comprising:
a plurality of hard disk drives operably coupled to the second SCSI bus.

15. The information handling system of claim 14 wherein data is stored on the plurality of hard disk drives in a RAID configuration, wherein the data is accessible to the first computer system via the first and second SCSI buses when the first SCSI connector circuit is activated.

16. The information handling system of claim 1 wherein the second SCSI bus has a first bus end and a second bus end, the second SCSI bus is terminated at the first and second bus ends.

17. The information handling system of claim 1 wherein the first SCSI connector circuit is a SCSI driver circuit.

18. The information handling system of claim 17 wherein the first SCSI connector circuit is SCSI expander circuit.

19. An information handling system comprising:
a first server;
a second server;
a first SCSI bus, the first server operably coupled to the first SCSI bus via a first SCSI controller;
a second SCSI bus, the second server operably coupled to the second SCSI bus via a second SCSI controller; and
a data storage subsystem including:
a third SCSI bus having two ends, the third SCSI bus being terminated at both ends;
a data storage device operably coupled to the third SCSI bus;
a first SCSI connector circuit, the first SCSI connector circuit, when activated, operably coupling the first SCSI bus with the third SCSI bus;
a second SCSI connector circuit, the second SCSI connector circuit, when activated, operably coupling the second SCSI bus with the third SCSI bus;
a subsystem controller, the subsystem controller deactivating the first SCSI connector circuit to operably isolate the first SCSI bus from the third SCSI bus in response to a first SCSI signal from the first SCSI bus transitioning to an inactive state, the subsystem controller deactivating the second SCSI connector circuit to operably isolate the second SCSI bus from the third SCSI bus in response to a second SCSI signal from the second SCSI bus transitioning to an inactive state.

20. The information handling system of claim 19 wherein the first and second SCSI connector circuits are SCSI driver circuits.

21. The information handling system of claim 19 wherein:
the first SCSI signal is a termination power signal from the first SCSI bus;
the second SCSI signal is a termination power signal from the second SCSI bus.

22. The information handling system of claim 21 wherein:
the first termination power signal is provided by the first SCSI controller;
the second termination power signal is provided by the second SCSI controller.

23. The information handling system of claim 22 wherein the first SCSI controller receives a first enable signal, wherein the first termination power signal transitions to an inactive state in response to a change in state of the enable signal, wherein the subsystem controller deactivates the first SCSI connector circuit in response to the first termination signal transitioning to an inactive state.

24. The information handling system of claim 19 wherein the information handling system is a cluster system.

25. The information handling system of claim 19 further comprising:
a third server;
a fourth SCSI bus, the third server operably coupled to the fourth SCSI bus via a third SCSI controller;
wherein the data storage subsystem further includes:
a third SCSI connector circuit, the third SCSI connector circuit, when activated, operably coupling the fourth SCSI bus with the third SCSI bus;
wherein the subsystem controller deactivates the third SCSI connector circuit to operably isolate the fourth SCSI bus from the third SCSI bus in response to a third SCSI signal from the fourth SCSI bus tansitioning to an inactive state.

26. The information handling system of claim 19 wherein:
the third SCSI bus is implemented in a SCSI backplane;
the subsystem controller is embedded in the SCSI backplane;
the first and second connector circuits are embedded in the SCSI backplane.

27. The information handling system of claim 19 wherein the subsystem controller monitors at least one environmental condition of the data storage subsystem.

28. An information handling system comprising:
a first server;
a second server;
a third server;
a first SCSI bus, the first server operably coupled to the first SCSI bus;
a second SCSI bus, the second server operably coupled to the second SCSI bus;
third SCSI bus, the third server operably coupled to the third SCSI bus;
a data storage subsystem including:
a fourth SCSI bus;
a data storage device operably coupled to the fourth SCSI bus;
wherein the first, second, and third SCSI busses are operably coupled to the fourth SCSI bus;
wherein the data storage device is accessible by the first, second, and third servers;
wherein the fourth SCSI bus is implemented on a SCSI backplane.

29. The information handling system of claim 28 wherein the SCSI backplane includes:
a first SCSI physical connector, the first SCSI bus being operably coupled to the fourth SCSI bus via the first SCSI physical connector;
a second SCSI physical connector, the second SCSI bus being operably coupled to the fourth SCSI bus via the second SCSI physical connector;
a third SCSI physical connector, the third SCSI bus being operably coupled to the fourth SCSI bus via the third SCSI physical connector.

30. The information handling system of claim 28 further comprising:
a fourth server;
a fifth SCSI bus, the fourth server operably coupled to the fifth SCSI bus;
wherein the fifth SCSI bus is operably coupled to the fourth SCSI bus;
wherein the data storage device is accessible by the fourth server.

31. An information handling system comprising:
a first server;
a second server;
a third server;
a first SCSI bus, the first server operably coupled to the first SCSI bus;
a second SCSI bus, the second server operably coupled to the second SCSI bus;
a third SCSI bus, the third server operably coupled to the third SCSI bus;
a data storage subsystem including:
  a fourth SCSI bus;
  a data storage device operably coupled to the fourth SCSI bus;
wherein the first, second, and third SCSI busses are operably coupled to the fourth SCSI bus;
wherein the data storage device is accessible by the first, second, and third servers;
wherein the fourth SCSI bus having a first end and a second end;
wherein the first SCSI bus is operably coupled to the first end;
wherein the second SCSI bus is operably coupled to the second end.

32. An information handling system comprising:
a first server;
a second server;
a third server;
a first SCSI bus, the first server operably coupled to the first SCSI bus;
a second SCSI bus, the second server operably coupled to the second SCSI bus;
a third SCSI bus, the third server operably coupled to the third SCSI bus;
a data storage subsystem including:
  a fourth SCSI bus;
  a data storage device operably coupled to the fourth SCSI bus;
wherein the first, second, and third SCSI busses are operably coupled to the fourth SCSI bus;
wherein the data storage device is accessible by the first, second, and third servers;
wherein the first SCSI bus having two ends, the first SCSI bus being terminated at both ends;
wherein the second SCSI bus having two ends, the second SCSI bus being terminated at both ends;
wherein the third SCSI bus having two ends, the third SCSI bus being terminated at both ends;
wherein the fourth SCSI bus having two ends, the fourth SCSI bus being terminated at both ends.

33. A data storage subsystem comprising:
a first SCSI bus;
a connector operably coupled to the first SCSI bus for operably coupling a data storage device to the first SCSI bus;
a first SCSI connector circuit, the first SCSI connector circuit, when activated, operably coupling a second SCSI bus with the first SCSI bus;
a second SCSI connector circuit, the second SCSI connector circuit, when activated, operably coupling a third SCSI bus with the first SCSI bus;
a subsystem controller, the subsystem controller deactivating the first SCSI connector circuit to operably isolate the second SCSI bus from the first SCSI bus in response to a first SCSI signal from the second SCSI bus transitioning to an inactive state, the subsystem controller deactivating the second SCSI connector circuit to operably isolate the third SCSI bus from the first SCSI bus in response to a second SCSI signal from the third SCSI bus transitioning to an inactive state.

34. The data storage subsystem of claim 33 wherein:
the first SCSI bus is implemented in a SCSI backplane;
wherein the first SCSI connector circuit, the second SCSI connector circuit, and the subsystem controller are embedded in the backplane.

35. The data storage subsystem of claim 33 wherein:
the first SCSI signal is a termination power signal from the second SCSI bus;
the second SCSI signal is a termination power signal from the third SCSI bus.

36. The data storage subsystem of claim 33 wherein the subsystem controller monitors at least one environmental condition of the data storage subsystem.

37. The data storage subsystem of claim 33 wherein the subsystem controller executes firmware in deactivating the first SCSI connector circuit to operably isolate the second SCSI bus from the first SCSI bus in response to the first SCSI signal transitioning to an inactive state and in deactivating the second SCSI connector circuit to operably isolate the third SCSI bus from the first SCSI bus in response to the second SCSI signal transitioning to an inactive state.

38. The data storage subsystem of claim 33 wherein the first and second SCSI connector circuits are SCSI driver circuits.

39. The data storage subsystem of claim 33 further comprising:
a third SCSI connector circuit, the third SCSI connector circuit, when activated, operably coupling a fourth SCSI bus with the first SCSI bus;
wherein the subsystem controller deactivates the third SCSI connector circuit to operably isolate the fourth SCSI bus from the first SCSI bus in response to a third SCSI signal from the fourth SCSI bus transitioning to an inactive state.

40. The data storage subsystem of claim 33 wherein the first SCSI bus substantially conforms to the SCSI-2 standard architecture.

41. A data storage subsystem comprising:
a first terminated bus;
a connector operably coupled to the first terminated bus for operably coupling a data storage device to the first terminated bus;
a first connector circuit, the first connector circuit, when activated, operably coupling a second terminated bus with the first terminated bus;

a second connector circuit, the second connector circuit, when activated, operably coupling a third terminated bus with the first terminated bus;

a subsystem controller, the subsystem controller deactivating the first connector circuit to operably isolate the second terminated bus from the first terminated bus in response to a termination power signal from the second terminated bus transitioning to an inactive state, the subsystem controller deactivating the second connector circuit to operably isolate the third terminated bus from the first terminated bus in response to a termination power signal from the third terminated bus transitioning to an inactive state.

42. The data storage subsystem of claim 41 wherein:

the first terminated bus is implemented in a backplane;

wherein the first connector circuit, the second connector circuit, and the subsystem controller are embedded in the backplane.

* * * * *